J. D. REIFSNYDER & H. G. SCHWERDTLE.
MACHINE FOR APPLYING CORNER STAYING TABS TO BOX COVERING BLANKS.
APPLICATION FILED AUG. 8, 1912.
1,060,026.
Patented Apr. 29, 1913.
10 SHEETS—SHEET 3.
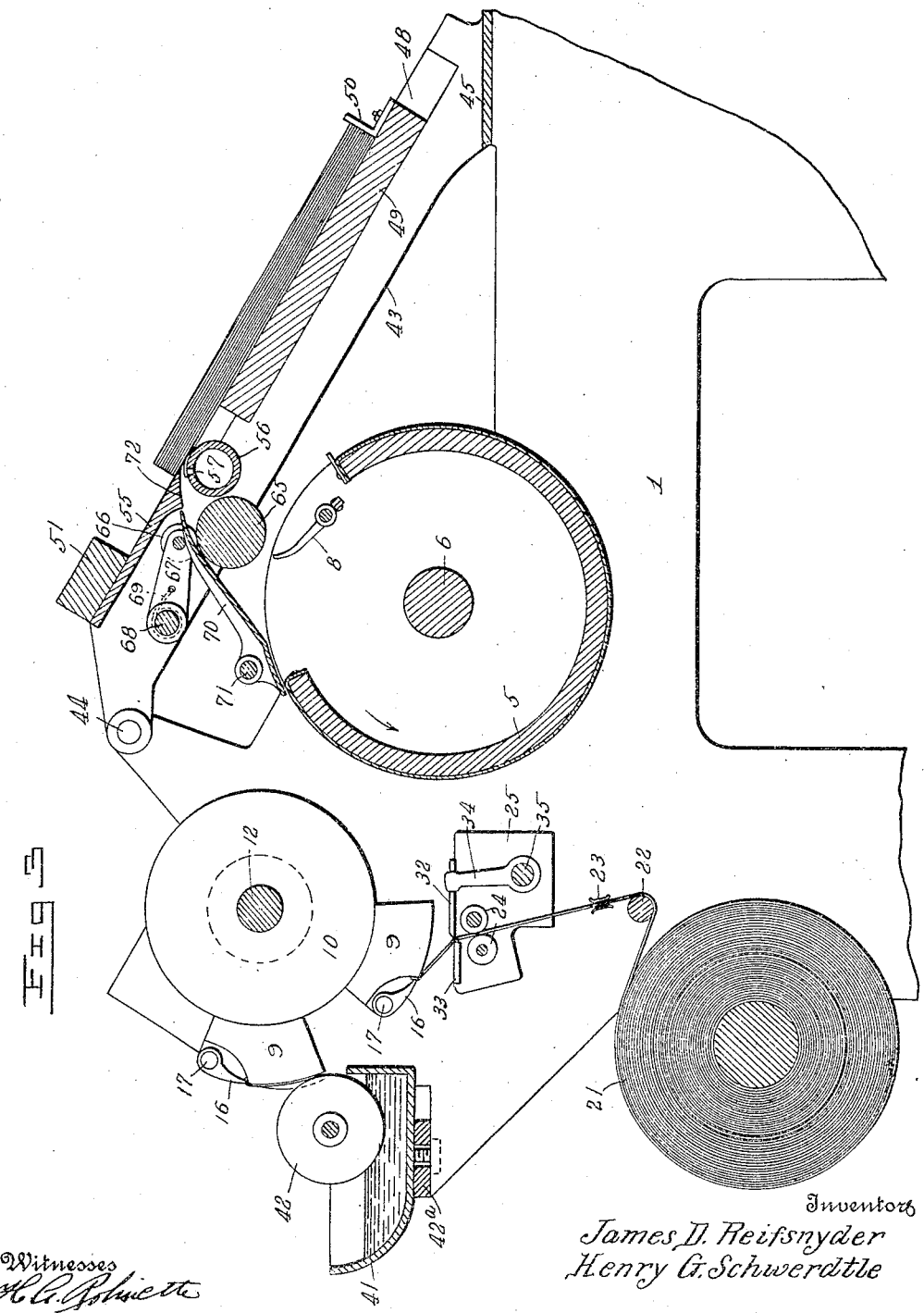
Inventors
James D. Reifsnyder
Henry G. Schwerdtle
By Meyers, Cushman & Rea
Attorney
Witnesses
H. G. Rohrette
G. M. Stucker

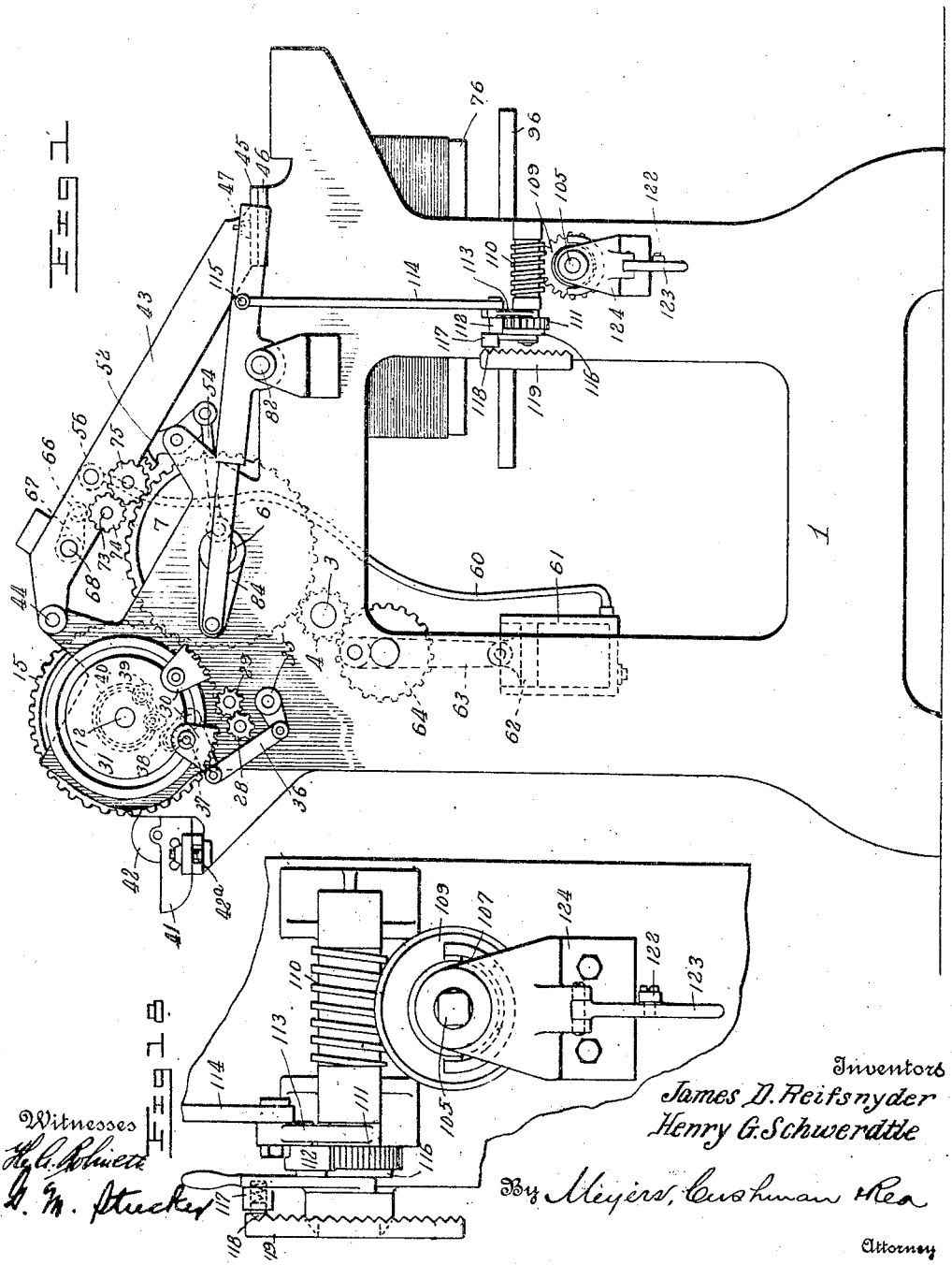

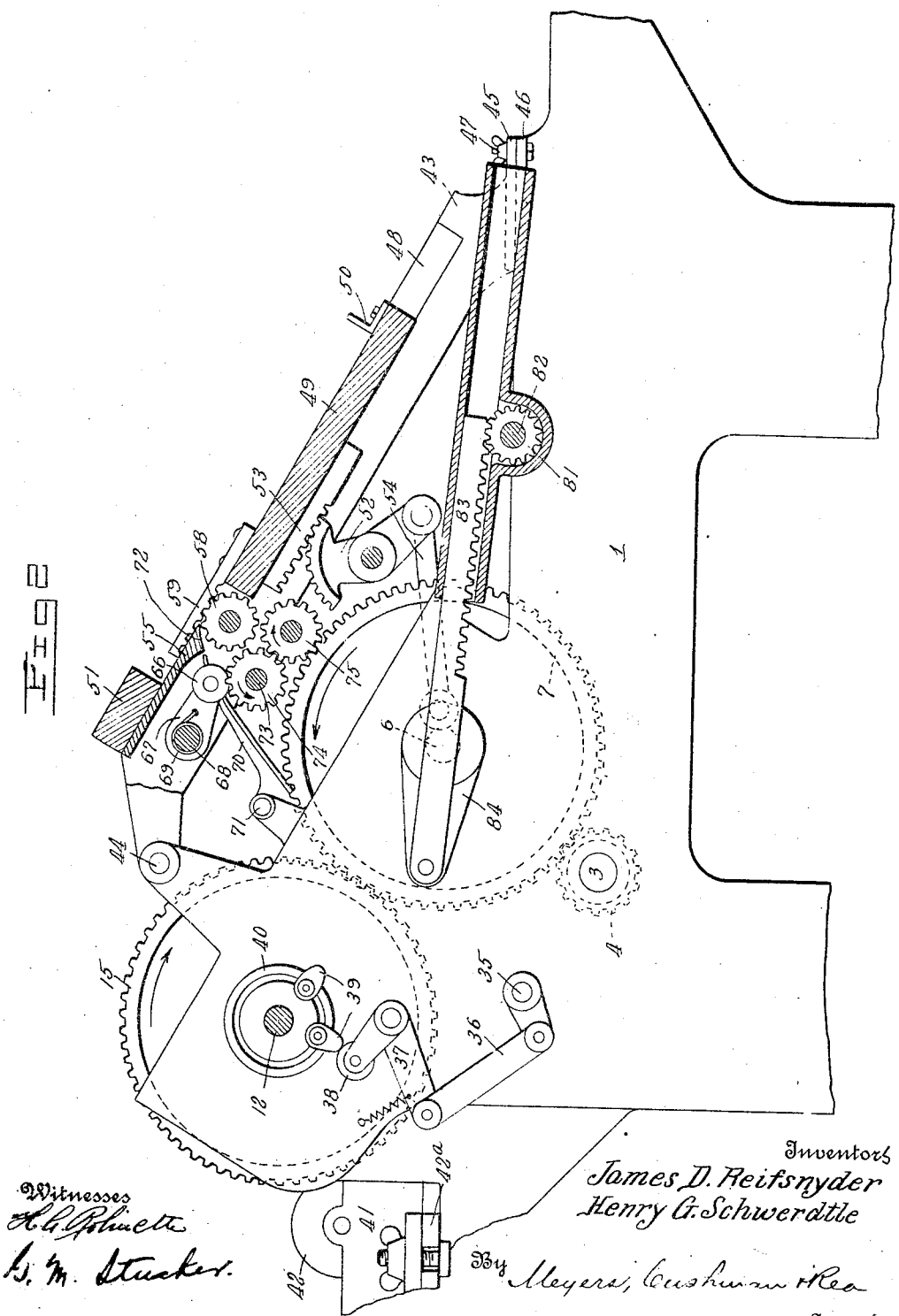

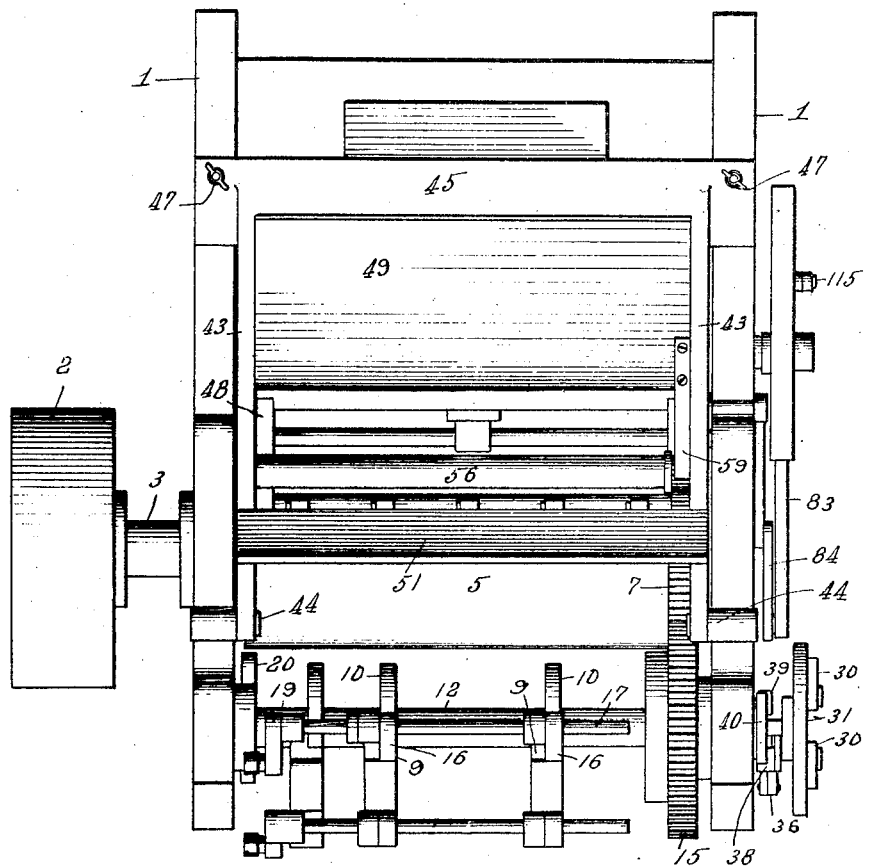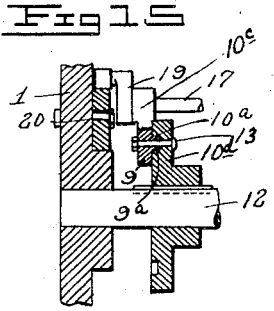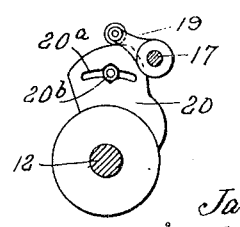

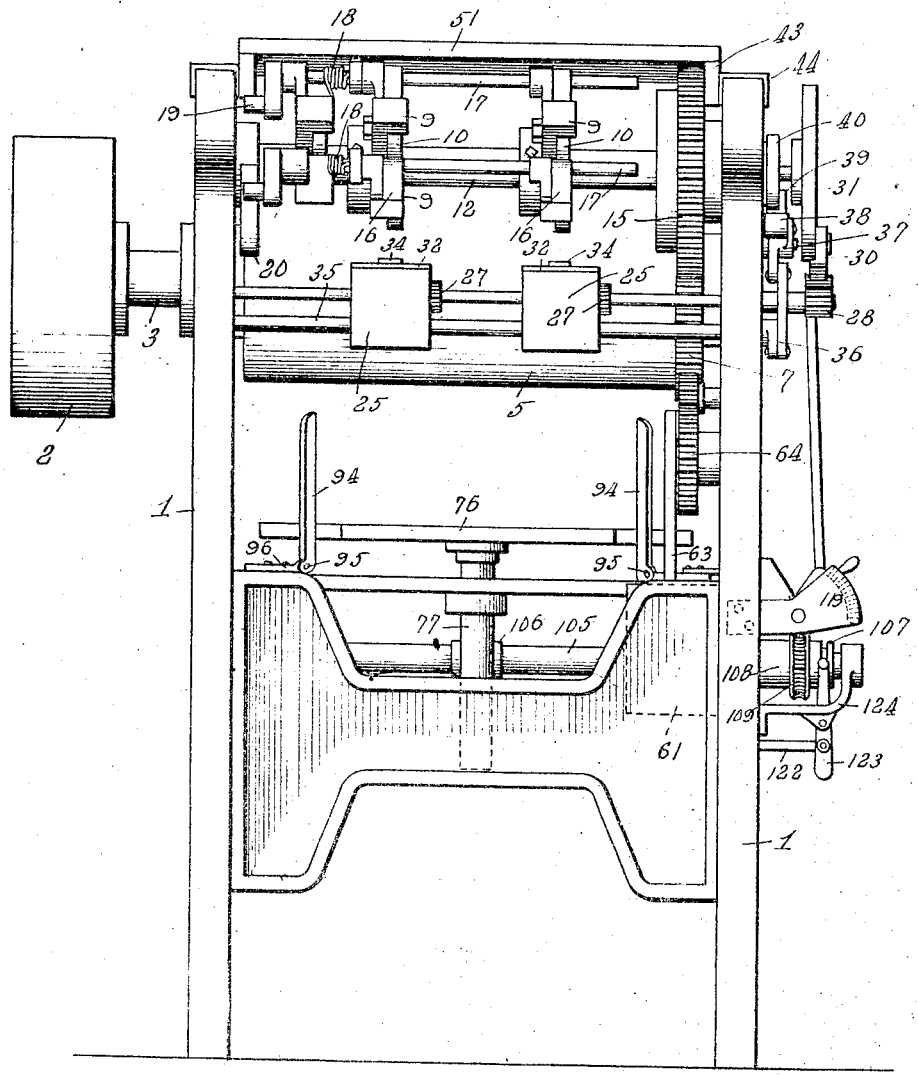

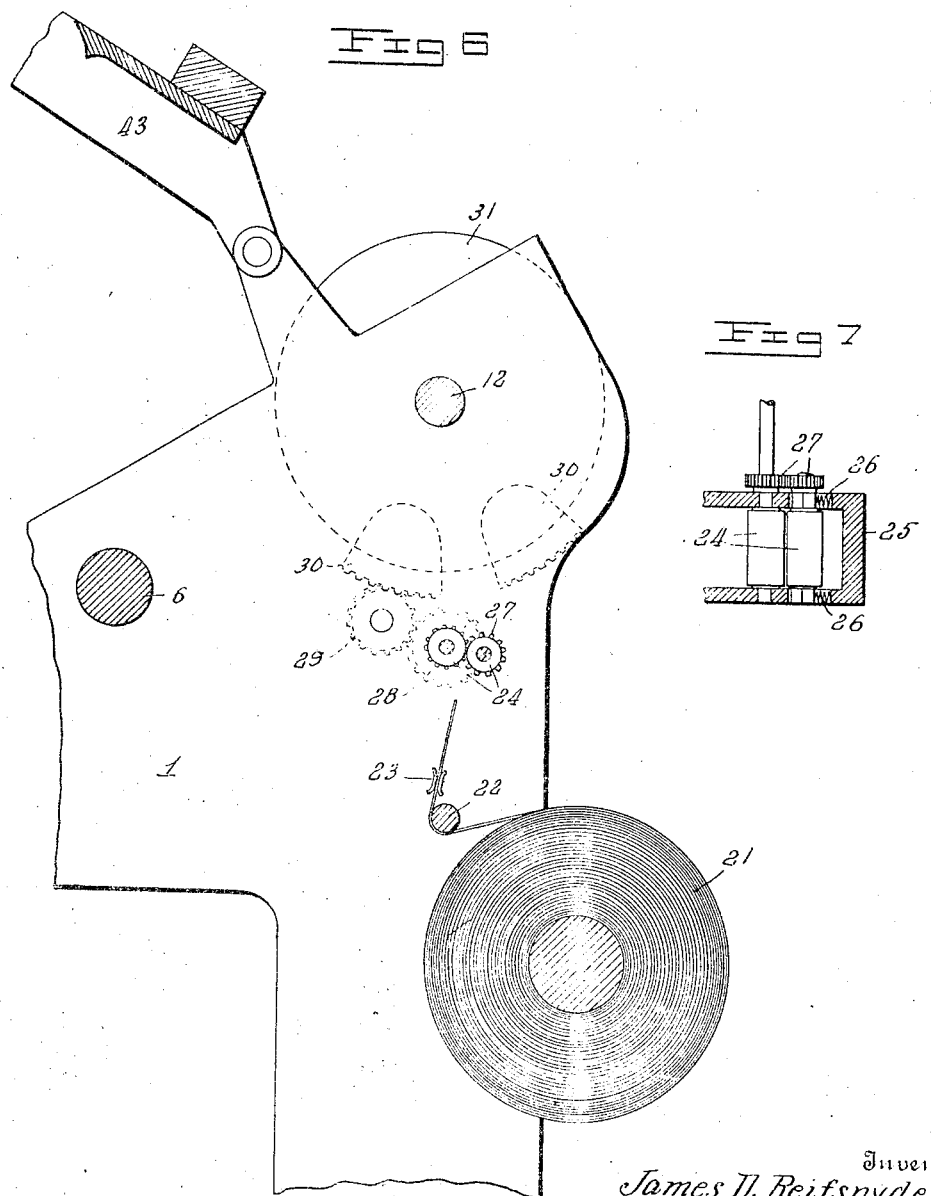

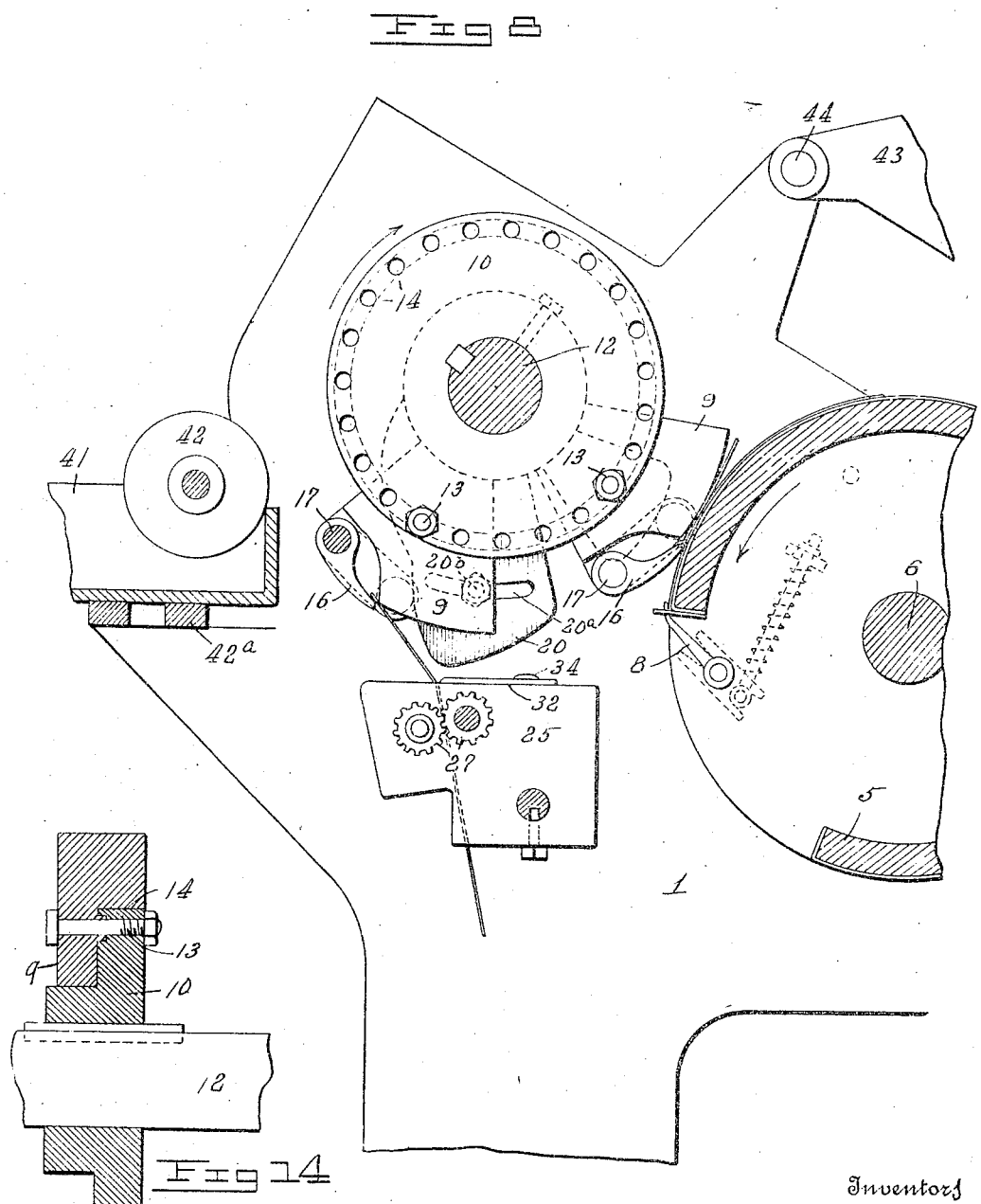

J. D. REIFSNYDER & H. G. SCHWERDTLE.
MACHINE FOR APPLYING CORNER STAYING TABS TO BOX COVERING BLANKS.
APPLICATION FILED AUG. 8, 1912.
1,060,026.
Patented Apr. 29, 1913.
10 SHEETS—SHEET 8.
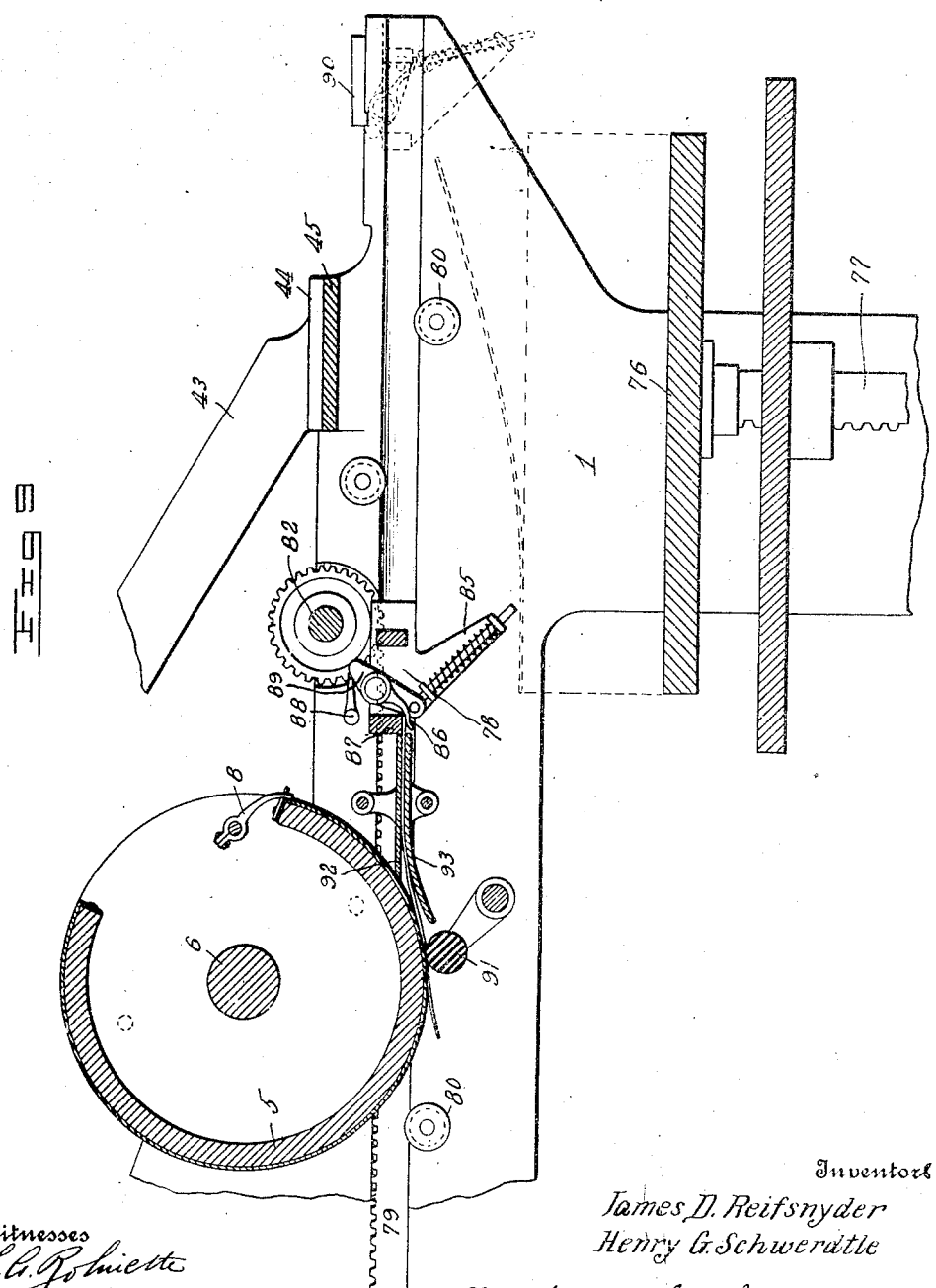
Inventors
James D. Reifsnyder
Henry G. Schwerdtle
By Meyers, Cushman & Rea
Attorney
Witnesses

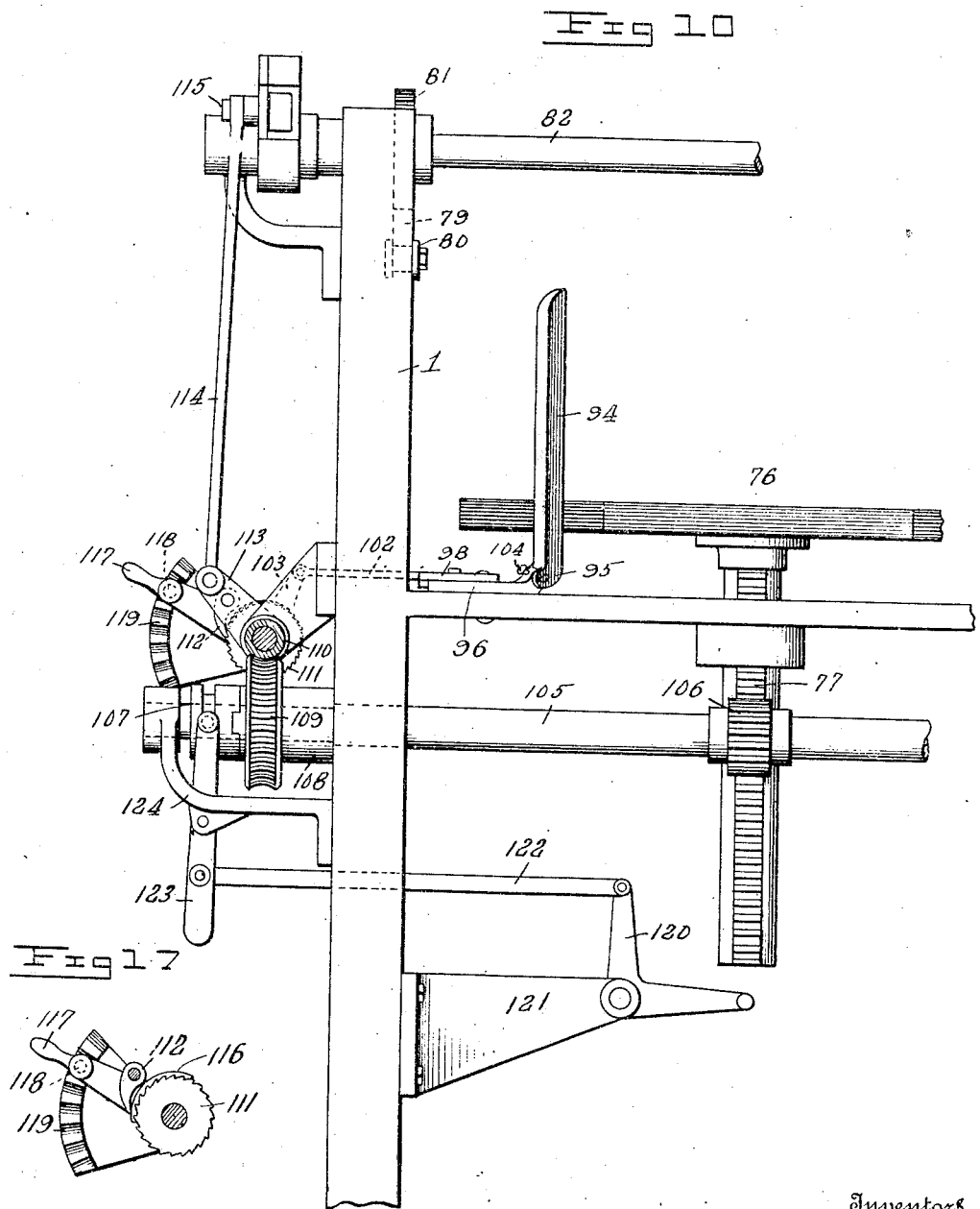

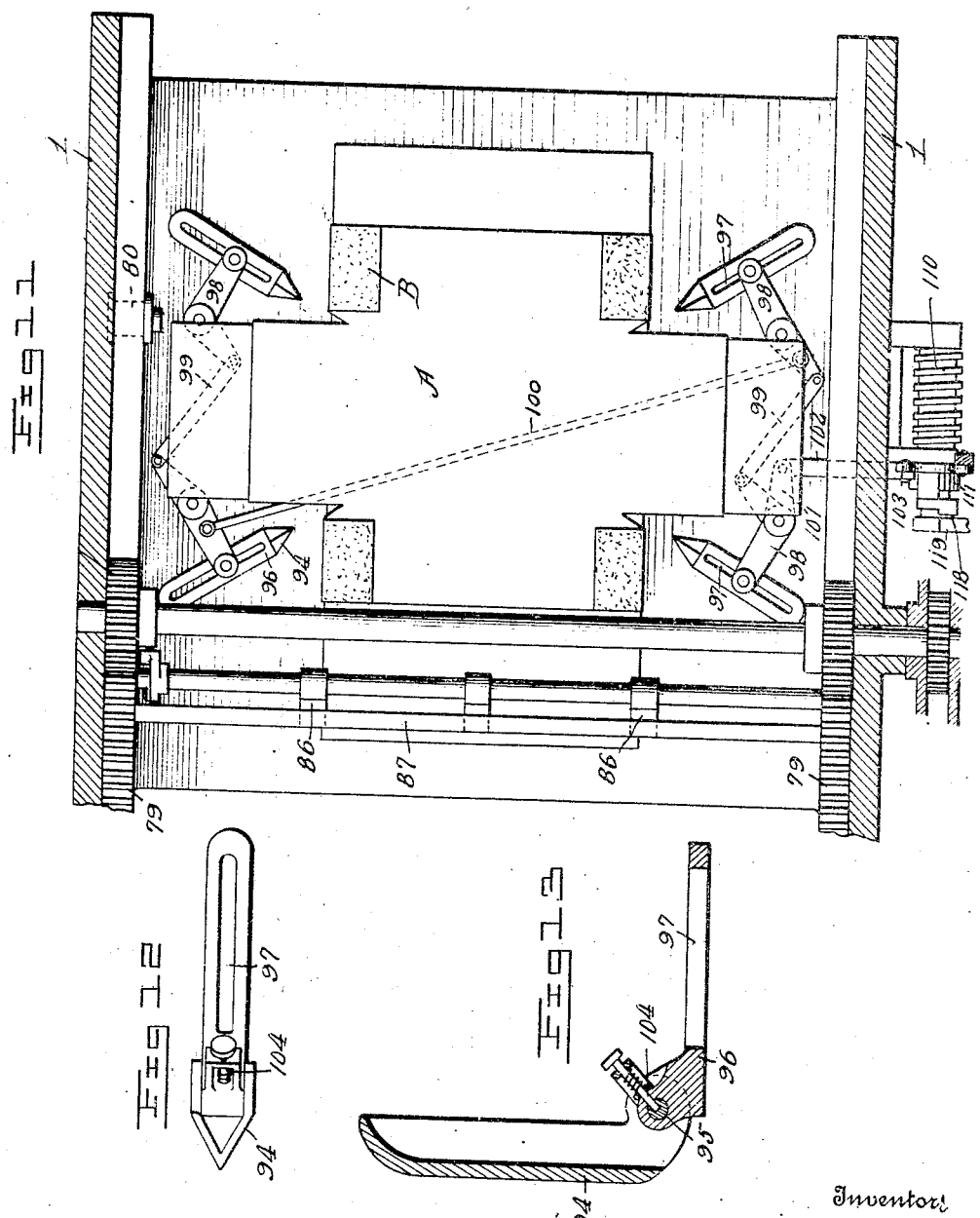

UNITED STATES PATENT OFFICE.

JAMES D. REIFSNYDER AND HENRY G. SCHWERDTLE, OF PHILADELPHIA, PENNSYLVANIA, ASSIGNORS TO STOKES & SMITH COMPANY, A CORPORATION OF PENNSYLVANIA.

MACHINE FOR APPLYING CORNER-STAYING TABS TO BOX-COVERING BLANKS.

1,060,026.

Specification of Letters Patent.

Patented Apr. 29, 1913.

Application filed August 8, 1912. Serial No. 714,017.

*To all whom it may concern:*

Be it known that we, JAMES D. REIFSNYDER and HENRY G. SCHWERDTLE, citizens of the United States, residing at Philadelphia, in the State of Pennsylvania, have invented new and useful Improvements in Machines for Applying Corner-Staying Tabs to Box-Covering Blanks, of which the following is a specification.

This invention relates to a machine for applying corner-staying tabs to box-covering blanks to produce blanks of the kind shown and described in the patent to J. Stogdell Stokes, #845,205, dated February 26, 1907.

In manufacturing paper or card-board boxes, it has been the usual practice in the past to first stay each corner of the box-shell with a stay-strip, this work being done on a so-called corner-staying machine and requiring four separate operations, one for each corner of the box, and the stayed or set-up box then has the cover or wrapper applied thereto, this work, in more recent years, being also carried on by machinery.

It having been proposed, according to the disclosure in the above mentioned Stokes patent, to eliminate the separate staying operations, by applying the stay-strips or tabs directly to the covering blank, so that the box would be simultaneously stayed and covered during the operation of applying the covering to the box-shell, there yet remained the problem of providing a simple and practical machine for properly applying the stay-tabs to the covering blanks, and it is this object that the present invention has in view.

According to our invention we provide a machine for rapidly and accurately feeding and associating box-covering blanks and staying tabs and applying the latter to the covering-blanks in proper position, so that when the completed blank is applied to a box-shell the attached tabs will embrace and cover the corner-joints of the box to securely stay the same, thus materially reducing the cost of manufacturing paper boxes.

Briefly and generally stated the machine embodies in the instance shown, means for feeding the blanks, means for cutting stay-tabs from a strip of stay-tab material, means for affixing the tabs to the face of the blank and means for delivering the stayed blanks to a suitable support.

In the present embodiment of the invention the machine is designed to apply two tabs to the blank at one operation, said means being duplicated and operating successively in order to apply the necessary number of tabs, namely four, during one complete cycle, and the machine is further made easily and quickly adjustable in order to accommodate blanks of different sizes.

The invention has for a further object to provide a machine of the character described with an automatic blank separating and feeding means for automatically separating from a pack, the blanks to be tabbed, and feeding the blanks successively to the tabbing mechanism.

The invention has for a still further object the provision of so-called jogging means adapted to aline and stack the tabbed blanks in an orderly manner upon a blank-receiving table.

The invention has for a still further object the provision of an automatic delivery mechanism for delivering the tabbed blanks from the tabbing mechanism to a delivery table, including means for gradually lowering the table with a step-by-step movement as the blanks are delivered thereon.

The invention has in view other more or less important objects all of which will be explained and made clear in the detailed description that follows this general statement.

In order to enable others to understand, make and use the invention we will now proceed to describe the same in detail reference being had for this purpose to the accompanying drawings, wherein, Figure 1 is a side elevation of a so-called tabbing machine constructed in accordance with the present invention. Fig. 2 is a similar view on a larger scale, parts of the machine being shown in section. Fig. 3 is a vertical section taken through the upper part of the machine and showing the blank feeding means and tab strip severing means. Fig. 4 is a top plan view of the machine. Fig. 5 is a rear elevation with the stay-strip feeding means removed. Fig. 6 is a sectional view of a portion of the machine showing the stay-strip feeding means. Fig.

7 is a detail view of the stay-strip feed rollers. Fig. 8 is an enlarged view partly in section, showing the stay-tab grippers, the moistener and the blank support or carrier. Fig. 9 is a vertical sectional view showing the blank discharging means and receiving table. Fig. 10 is a rear elevation of the blank receiving table, the table operating means, and the mechanically operated stacker. Fig. 11 is a plan view of the blank receiving table and the blank stacking or guiding means. Figs. 12 and 13 are detail views in plan and section, respectively, of the blank-stacking or guiding fingers. Fig. 14 is a detail sectional view of one of the tab-segments and its disk mounting. Fig. 15 is a detail view partly in section and partly in elevation showing the bearing for the tab-gripper shaft and the operating cam. Fig. 16 is a detail showing the gripper shaft operating cam. Fig. 17 is a detail view of the pawl-controlling means of the table lowering mechanism. Fig. 18 is a similar view made on a larger scale and looking at the front of this mechanism.

Referring to the drawings the reference numerals 1 designate the two side members of a machine frame having suitable connecting cross pieces or webs. The operative parts of the machine are driven from a pulley 2 mounted on a power shaft 3 extending transversely through the frame members, the said shaft having on that end opposite the pulley, a gear wheel 4 which meshes with gears on other shafts carrying parts of the operating mechanism, as will presently appear.

The means for supporting and carrying the box-covering blanks that are to receive the stay-tabs, comprises in the instance shown, a rotary drum 5 mounted on a transverse shaft 6 upon one end of which is a gear 7 meshing with the gear 4 of the power shaft 3, see Figs. 1 and 2, whereby said blank carrying and supporting drum is continuously rotated in the direction of the arrows as shown in the various figures. The said drum 5 carries two or more gripper fingers 8, see Figs. 3 and 8, which fingers project through an opening in the drum and overhang an edge wall of said opening, said fingers being constructed and operating to grip one end of the covering blank in order that said blank may be held to and carried by the drum during its traveling movement. The well known tumbler mechanism is provided for operating the gripper fingers in order to receive and grip the blanks as they are successively fed to the drum, said mechanism also operating to open the fingers and release the blank after the stay-tabs have been applied thereto. Coöperatively associated with the said blank carrying and supporting drum is the stay-tab carrying and affixing means shown in the present instance as comprising two pairs of spaced segments 9, each segment having a curved outer face adapted to make contact with the curved face of the rotary drum, and thus serve to press the stay-tabs carried by the segments upon and affix them to the face of the covering blank carried by the rotary drum. The stay-tab carrying segments 9 are adjustably mounted upon disks 10 carried by a shaft 12 mounted transversely of the machine and parallel with the shaft 6. In the present instance we have shown the machine as provided with two of the said disks 10 mounted on the same shaft, the disks being adjustable longitudinally of the shaft, the disks being provided with collars and set screws for this purpose, as more clearly shown in Fig. 5. As before stated each of the disks 10 carries a pair of the stay-tab carrying segments 9, one located in advance of the other, these segments being each provided on one face with a laterally projecting rib 9$^a$ that takes into a circumferential groove 10$^a$ formed in the face of the disk, as more clearly shown in Fig. 14, the disks being further provided with spaced openings 14 around the circumference thereof to receive fastening bolts 13 in order to permit circumferential adjustment of the segments 9 toward and from each other, whereby to adjust the machine to operate upon blanks of different sizes, it being understood that these box covering blanks, upon the face of which the stay-tabs are to be affixed, vary in size depending upon the size of the box to be covered, and it being also understood that the stay-tabs must be accurately positioned upon the face of the blanks in order that the tabs will properly cover the corner-joints of the box when the blank is applied thereto.

One type of blank with the stay-tabs properly applied thereto according to this invention, is illustrated in Fig. 11 of the drawings, wherein the reference letter A designates the blank and B the corner stay-tabs applied thereto. By adjustably mounting the disks 10 upon the shaft 12 and adjustably supporting or connecting the stay-tab carrying segments upon said disks, it will be apparent that these parts of the machine may be easily and quickly adjusted to operate upon the blanks of different size. The shaft 12 carries at one end a gear wheel 15 which meshes with the gear 7 carried by the blank supporting drum shaft 6, so that the said drum 5 and the stay-tab carrying and affixing means will operate in unison, these two mechanisms rotating in opposite directions. Each of the blank-carrying and affixing segments 9 carries at its forward end a gripper finger 16, each pair of fingers being mounted upon a rock shaft 17, see Figs. 4, 5, and 8, the said rock shafts being normally urged in a direction to hold the fingers closed by means of coiled springs 18. The rock shafts are journaled in their respective segments 9 and also in an adjustably mounted block 10ᶜ carried by a disk 10ᵈ mounted on shaft 12, the said disk 10ᵈ being similar in construction to the disks 10, just described, and each shaft has on its outer end a crank arm 19, said crank arms being arranged in the path of an adjustably fixed cam 20 carried by the machine frame, as more clearly shown in Figs. 15 and 16, the said cams being so arranged that during the rotary movement of the segments the gripper fingers will successively open and close, first to receive the end of a strip of stay-tab material whenever a segment is brought to a position opposite the feeding means for said stay-tab material, and second, to release the stay-tabs when the latter have been properly affixed to the face of the blank, as will hereinafter more clearly appear, this operation of the fingers being brought about by engagement of the crank arms 17 with the cams 20. The cams have a curved slot 20ᵃ therethrough through which a fastening screw 20ᵇ passes, whereby said cams may be adjusted and then locked against movement.

The stay-tabs in the instance shown are successively cut from strips of suitable stay-tab material rolled upon spools or reels one face of each strip having an adhesive coating which is moistened by moistening rollers after the tabs have been cut, and while they are on their way or moving toward the blank support, suitable means being provided for successively feeding the strips in stay-tab lengths and then severing the strips to form tabs, the feeding and severing means being automatically operated at proper intervals and in regular sequence with the movements of the carrying and affixing devices, so that proper tab lengths of the said strip material will be fed forward and severed whenever a pair of the tab carrying and affixing devices is brought in cooperative relation to the stay-tab feeding means.

As more clearly shown in Figs. 1, 2, 3, 6, 7 and 8, a strip of stay-tab material is shown in the form of a reel or roll 21, one end of which passes over a guide rod or roller 22, through a guide 23 and between a pair of feed rollers 24, mounted in a suitable frame 25, as more clearly shown in Fig. 7, one of the rollers being urged toward the other by means of springs 26, and the said rollers being provided with internesting gears 27. It will of course be understood that the present machine employs two reels of stay-strip material, two sets of feed rolls, two strip severing devices and two moistening rolls and the following description of these mechanisms should be considered with this in mind. The shaft on which one of the feed rolls of each pair is mounted is provided with a gear 28 with which another gear 29 meshes, the said gear 29 and through it the feed rolls 24, being intermittently operated to successively feed stay-tab lengths by means of the toothed segments 30 adjustably mounted upon a disk 31 carried by the shaft 12, on which the stay-tab carrying and affixing segments are mounted. The said toothed segments 30 are made adjustable circumferentially around the disk 31 in order that these parts may be adjusted as desired to properly feed stay-tab lengths suited to different sized blanks.

Arranged above and cooperatively associated with each pair of feed rolls 24 is a movable strip cutting blade 32 that cooperates with a fixed blade 33, the said strip being fed by the rollers between the severing blades. The movable blade 32 is carried by an arm 34 mounted upon a rock shaft 35, see Fig. 3, said rock shaft being connected by crank and link mechanism 36 with a bell-crank lever 37 carrying at its free end a roller 38 that is adapted to be intermittently and successively actuated by a pair of tappets 39, each separately and adjustably mounted upon a disk 40 carried by the shaft 12, as more clearly shown in Fig. 2, the tappets 39 being arranged in the path of the rollers 38, and operating in sequence with the feed movement of the strip feed rolls 24, and also with the grippers 16 carried by the blank carrying and affixing segments 9 so that whenever one of the said segments 9 appears opposite the strip feeding and severing means the free end of the stay-strip material will be fed to the gripper and gripped, and the severing device will then be actuated to sever a stay-tab length from the strip, which stay-tab length will then be held in surface contact with the curved face of its segment 9 in position to be affixed to the blank when the adhesively coated surface thereof is pressed against the face of the blank.

Arranged above and in the path of movement of each pair of tab carrying segments is a tank 41, which may contain glue or water, and in which rotates an applying or moistening roller 42, the periphery of said rollers being arranged to make contact with the outer face of the stay tabs as the tab carrying segments 9 successively pass the same, whereby either to moisten an already gummed tab or to apply an adhesive coating to the face of an ungummed tab. We prefer to mount the tanks 41 forwardly and laterally adjustable so that the rollers 42 may be properly adjusted to make contact with the stay-tabs as they are moved past the same during the operation of the machine whatever the adjustment of the segments may be, and to this end the tanks 41 are supported upon a base piece 42ᵃ extending transversely of the machine frame and adjustably held by means of thumb-screws or other suitable means passing through a slot in said base piece as more clearly shown in Figs. 1 and 2. We have shown the machine as provided with an automatic blank separating and feeding means for automatically delivering the blanks to the blank supporting and carrying drum, the blanks being taken successively from a pack and delivered to said drum, and while we have shown the machine as provided with an automatic feed for the blanks, and while we have shown one form of feed suited to the present type of machine, we do not wish to be understood as limiting ourselves to a machine having an automatic feed, as the blanks may be fed to the machine by hand; nor do we wish to be understood as limiting ourselves to the particular form of feed mechanism shown, as any preferred feeding means may be employed. The automatic feed in the instance shown comprises an inclined frame 43 pivoted at its upper end as at 44, and having a transverse plate 45 at its lower end, which rests upon a similar plate 46 forming a part of the machine frame, the said inclined frame 43 being held in position by means, such as a bolt and wing-nut, as shown at 47, Fig. 2. The inclined frame is hinged in order that it may be lifted to gain access to the interior parts of the machine. This inclined frame 43 is provided with longitudinal ways 48 in which is mounted for reciprocation a support 49 for a pack of blanks to be tabbed, the said support having a stop 50 at its lower end constituting an abutment for the blank pack, and the frame 43 at its upper end is provided with an abutment block 51 against the end wall of which the pack of blanks abuts during reciprocation of the support 49 whereby to keep the edges of the pack of blanks in alinement. The blank support 49 is reciprocated by means of a segment 52 meshing with a rack 53 secured to the bottom of the support 49, the segment having movement imparted thereto by means of a link 54 connected eccentrically to a disk mounted on the shaft 6 of the blank supporting and carrying drum 5, all as more clearly shown in Fig. 2.

The inclined frame 43 carries at its upper end a shelf 55 that supports the upper end of the pack of blanks during the upward movement thereof which is imparted to the pack as the support 49 reciprocates, and between the lower edge of the shelf 55 and the upper end of the reciprocating support 49 there is located a suction roll 56 having openings 57 through the periphery thereof, the said roll being so located that when the upper end of the pack of blanks rests upon this roll the latter will operate by suction to draw away and hold in contact therewith the upper end of the lowermost blank of the pack when the blank support with the pack thereon is in its lowermost position of movement, the suction roll 56 being then rotated to draw the adhering blank away from the pack toward suitable feed rollers presently to be described. The suction roll 56 carries at one end a gear wheel 58, with which a rack 59 meshes, said rack being carried by the reciprocating blank support 49 and operating to impart backward and forward rotary movements to the suction roll to successively take off and deliver the blanks from the pack. The suction roll is in communication, by means of a pipe 60, see Fig. 1, with a pump cylinder or other suitable suction creating device 61 in which reciprocates a piston 62, the latter being operated by means of a piston-rod 63 having a crank connection with a gear 64, the latter being driven by means of the gear 4 on the power shaft 3. The piston is so timed in its operation that a suction pull will be created in the suction roll 56 whenever the suction openings 57 in said roll lie opposite or face the pack of blanks, and the suction will be broken as soon as the suction roll is rotated to bring its adhering blank in proximity to the feeding rolls, at which moment the suction is broken to free the blank, after which the suction roll returns to position to receive another blank. Also journaled in the frame 43 is a feed roll 65 upon which rests a plurality of presser rolls 66, said rolls being mounted on arms 67 carried by a cross shaft 68, the said arms being normally urged downward by means of springs 69 in order that the rolls 66 may be held in yielding contact with the feed roll 65. Between the presser rolls 66 are deflector fingers 70 each pivoted at 71, said fingers extending slightly beyond the feed roll 65, and terminating at a point to form a substantial continuation of a beveled wall 72 formed at the lower end of the shelf 55, the said fingers 70 serving to accurately guide the blanks toward the blank-carrying and supporting drum 5 and in position to be gripped by the gripper fingers 8 carried by said drum. The feed roller 65 is mounted on a shaft 73 which carries a gear 74 meshing with a similar gear 75 that is in turn in mesh with and driven by a gear 7 on the blank supporting and carrying drum 5, these parts being so constructed and operating as to cause the blank feeding means to be operated by and in regular sequence with the movements of the blank supporting and carrying drum. We have also shown the machine as provided with a receiving table for the tabbed blanks, and means for delivering the blanks from the blank supporting and carrying drum onto said table, and this means will now be described, reference being had more especially to Figs. 9, 10, and 11, wherein the reference numeral 76 designates a blank receiving table, which is preferably of cruci-form shape, or any other form conforming to the general outline of the box covering blank. This table 76 is mounted upon a vertically extending rack 77, and mechanism presently to be described operates to gradually lower the table with a step-by-step movement as the tabbed blanks are piled thereon.

The means for delivering the tabbed blanks on the table comprises a reciprocating carriage 78 that is carried by a pair of racks 79 located parallel with the side members 1 of the machine frame, said racks being supported upon rollers 80. The carriage is reciprocated back and forth toward and from the blank supporting and carrying drum 5 by means of a gear wheel 81 mounted upon a shaft 82 extending transversely of the machine frame, said gear 81 being alternately rotated in opposite directions by means of a reciprocating rack 83 jointed to a crank arm 84 mounted on the shaft 6 of the blank supporting and carrying drum 5, all as more clearly shown in Fig. 2.

The carriage is provided with a so-called tumbler gripper 85, the gripper finger 86 of which coöperates with an edge 87 of the carriage, mechanism being provided for throwing the finger 86 away from the edge 87 to receive between said parts a blank to be gripped whenever the carriage is moved to a position adjacent the drum 5, and mechanism being also provided to cause the finger to grip a blank when in this position. This mechanism consists of a stop 88, against which an arm 89 of the gripper finger makes contact to cause the tumbler of the gripper mechanism to operate to swing the finger toward the edge 87 of the carriage and in gripping contact with the blank, whenever a blank is delivered thereto. A similar stop 90 is provided at the far end of the machine and arranged to engage the arm 89 of the gripper finger whenever the carriage reaches the downward limit of its movement in order to release the blank when the carriage is in the position described, and permit the same to fall upon the table 76, all as more clearly shown in Fig. 9.

A blank feeding and supporting roll 91 is arranged to bear against the under side of the blank supporting and carrying drum 5 in order to support and feed the blank while it is being carried around by the said drum, and after it has been released by the gripper fingers 8. Forward of said roll 91 is a pair of guide plates 92 and 93 between which the blank is fed, the lowermost guide plate 93 having its end adjacent the roll 91 deflected downwardly to more readily receive the free end of the blank as it is fed forward during rotation of the drum 5. By the means described it will be apparent that, as the blank supporting and carrying drum 5 is rotated to have the tabs affixed thereto, immediately the forward end of the blank carried by said drum passes the presser roll 91 the gripper fingers 8 will release the gripped end of the blank allowing the same to fall upon the forward end of the guide 93, continued rotary movement of the drum 5 serving to feed the blank between the guides 92, 93, and in position to be gripped by the gripper finger 86 of the blank delivery carriage. When the blank has been gripped as just described, the carriage will then be moved forward to bring the blank over the table 76, whereupon the stop 90 will operate to open the gripper fingers, thus releasing the blank and allowing it to fall upon the table.

As it is desirable to stack the blanks upon the table 76 in an orderly manner with their edges in accurate alinement, we have provided a so-called "jogging" or alining mechanism associated with the table, said mechanism being arranged to operate upon each blank as it is delivered to the table, and aline it with the previously delivered blanks, and this mechanism consists in the instance shown of four upwardly extending arms 94, one disposed between each cut-out angle of the table 76, said arms each being preferably pivoted at 95 to a base plate 96, the latter having a longitudinal slot 97, whereby the arms 94 may be adjusted toward and from the cut-out angular portions of the blank. The said arms 94 are each mounted upon a pivoted lever 98, each pair of levers being interconnected by a short link 99, and two of the levers being further connected by a diagonally arranged connecting link 100. One of the links 98 has a crank arm 101 connected by means of a reciprocating link 102, which in turn is connected at its upper end to a rocking crank 103 more clearly shown in Figs. 10 and 11, said rocking crank 103 having a rocking movement imparted thereto at regular intervals, as for instance whenever a blank has been delivered to the receiving table 76, and this rocking movement is imparted to the arms 94 in such manner as to cause said arms to simultaneously move inward toward each other or toward a common center, and in contact with the edges of the blank immediately after it has been delivered to the table, whereby to aline said blank with those previously delivered, and thus stack the blanks in an orderly manner. The arms 94 are each provided with a latch pin 104 that takes into an opening in its pivot joint 95 in order to lock the arms in a vertical position, the arms being thus pivotally mounted and the latches being provided, in order that said arms may be unlatched and moved down parallel with its base plate 96 in order to permit easy removal of the pack of tabbed blanks from the table 76. The slots 97 are provided in the base plates in order to permit the arms to be adjusted to accommodate blanks of different sizes.

As before stated we also provide means for lowering the table with a step-by-step movement as the blanks are delivered thereto, and this means comprises a shaft 105 extending transversely of the machine frame, said shaft carrying a gear 106 in mesh with the rack 77 upon which the table is mounted. On the outer end of the shaft 105 is splined a laterally shiftable clutch member 107 that takes into a coöperating clutch member on a sleeve 108 loosely mounted upon the shaft 105, and on said sleeve is fixed a worm wheel 109 with which a worm 110 meshes, all as more clearly shown in Figs. 1, 5 and 10. Fixed to the worm 110 is a ratchet wheel 111 with which a pawl 112 engages, said pawl being mounted on an arm 113 that is fixed to the worm 110, and said arm being reciprocated by means of a rod 114 connected at its upper end to a pivoted rocking arm 115 that is rocked by means of the rack 83 as more clearly shown in Figs. 1 and 2. By this means it will be seen that as the rocking arm 115 is rocked through the movements of the rack 83 this movement will impart a reciprocating movement to the rod 114, which in turn, through the pawl 112 engaging the ratchet wheel 111 will rotate said ratchet wheel with a step-by-step movement and thus impart rotary movement to the worm 110 to rotate the worm wheel 109, which in turn will rotate the shaft 105 through the gear and rack connection with the table 76 to gradually lower the same as the blanks are delivered thereto.

We provide means for varying the amount of movement given the table at each step-by-step actuation of the operating parts, and to this end we mount loosely upon the shaft that carries the ratchet wheel 111 a cam disk 116, see Fig. 1, said cam disk having an arm 117 fixed thereto, which arm carries a yieldable locking pin 118 adapted to take into one or the other of the notches or teeth formed in the curved segment 119. The cam disk 116 has its cam face so arranged as to constitute a support for the pawl 112 to hold the pawl normally out of engagement with the teeth of the ratchet wheel 117, at least for a portion of the movement of said pawl, and by adjusting and setting the disk 116 it will be apparent that the pawl may be made to engage, during each actuation thereof one, two, three or more of the teeth of the ratchet wheel, and thus determine the amount of rotary movement imparted to the parts actuated thereby, and the amount of lowering movement of the table during each actuation of the pawl. We have also provided means for automatically throwing the table lowering means out of action when the table has reached its lowermost position, as for instance when it has been completely filled with a pack of tabbed blanks. This means comprises a bell-crank lever 120 pivoted to a bracket 121, one arm of the bell crank lever being arranged below and in the path of movement of the lower end of the rack 77 upon which the table 76 is supported and the other arm of said lever being connected by means of a link 122 to a lever 123 pivoted to a bracket 124, the upper end of said lever being forked and in engagement with a groove formed in the laterally shiftable clutch element 107, all as more clearly shown in Fig. 10. By this arrangement whenever the table with its pack of tabbed blanks reaches its lowermost position, the lower end of the rack 77 will engage the arm of the bell crank lever 120 and rock the same on its pivot in such manner as to move the rod 122 in the direction of the arrow Fig. 10, and throw the laterally shiftable member 107 of the clutch element out of engagement with the coöperating clutch element that carries the power transmitting worm wheel 109, whereby said wheel will run free on the shaft 105 during any further operation of the machine after the table has reached its lowermost position.

The operation of the machine will be understood from the foregoing description taken in connection with the following: A pack of blanks having been placed upon the inclined blank support 49 and power having been applied to the power shaft, all the operating mechanism will be set in motion. The lowermost blank of the pack will be separated therefrom by the suction roll 56 and fed to the blank supporting and carrying drum 5, the blank being held thereto during rotation of the drum by means of the gripper fingers 8. During this rotation of the drum 5 the tab carrying segments will also rotate in a direction opposite that of the rotation of the drum 5 and during said rotation the strips of tab forming material will be fed from the reels 21 toward the tab carrying segments, the end of each strip being fed to the segments as they successively appear and gripped by the grippers 16 after which tab lengths of the material are severed by the severing means. As the tab-carrying segments move toward the blank carrying drum their outer faces are brought in contact with the moistening rollers 42 to moisten the tabs, and further rotation of the segments brings the moistened faces of the tabs into contact with the face of the blank carried by the drum, the segments pressing the tabs firmly against the face of the blank and affixing them thereto in proper position depending upon the adjustment of the segments relative to the blank. As the drum 5 continues to rotate, immediately it reaches a position where the forward end comes opposite the guides 92, 93, the gripper fingers 8 will release the end of the blank, allowing the same to rest upon the lowermost guide 93 and continued movement of the drum 5 will feed the blank forward between the guides until it reaches the edge 87 of the delivery carriage 78. At this moment the gripper fingers 86 will grip the blank and the carriage 78 will then be moved outward by the mechanism heretofore described until it reaches the limit of its outward movement, whereupon the gripper fingers will release the blank and allow it to fall upon the table 76, or upon the blank previously deposited upon said table. At this moment the "jogging" or alining fingers 94 will be brought into action to center the last deposited blank accurately with relation to the pack of blanks already on the table so that as the blanks are delivered to the table they will be stacked in an orderly manner with their edges properly alined. As the blanks are delivered to the table the latter will be gradually lowered with a step-by-step movement by means of the table lowering mechanism described, and when the table reaches its lowermost position the table lowering mechanism will be thrown out of operation by means of the lower end of the rack 77 engaging the bell-crank lever 120, which engagement will cause a separation of the laterally shiftable clutch element 107 from its coöperating clutch element, and allow the worm wheel 109 to run free during any further operation of the machine.

We have shown and described herein a preferred embodiment of our invention, but we do not wish to be understood as limiting ourselves to the precise construction and arrangement of parts defined, except as we may be limited by the terms of the appended claims.

Obviously we may omit entirely the automatic feeding means or substitute for the feeding means shown any other suitable form of automatic feed. Obviously, also, we may eliminate entirely the receiving table and the delivery means associated therewith, or we may substitute for such means any other preferred form of mechanism for accomplishing the work performed by these mechanisms.

What we claim is:—

1. In a machine of the character described and in combination, means for supporting a blank and separate laterally spaced means coöperatively associated with the first named means for applying a plurality of stay-tabs to the face of the blank while on said support.

2. In a machine of the character described and in combination, a traveling support for advancing a blank and laterally spaced plural means coöperating therewith for successively affixing a plurality of laterally spaced stay-tabs to the face of the blank while being advanced by said support.

3. In a machine of the character described and in combination, a rotary support for a blank and laterally spaced means coöperating therewith for affixing a plurality of stay-tabs to the face of a blank carried by said support.

4. In a machine of the character described and in combination a rotary support for a blank and laterally spaced rotary means coöperating therewith for successively affixing a plurality of laterally and longitudinally spaced stay-tabs to the face of a blank while on said support.

5. In a machine of the character described and in combination, a support for a blank and laterally spaced rotary means coöperatively associated therewith for successively affixing a plurality of lateral spaced stay-tabs to the face of the blank while on said support.

6. In a machine of the character described and in combination, means for supporting a blank, means for feeding a blank to said support, and separate laterally spaced means coöperatively associated with the support for affixing a plurality of laterally spaced stay-tabs to the face of a blank while on said support.

7. In a machine of the character described and in combination, a rotary support for advancing a blank, means for feeding a blank to said support, and separate laterally spaced means coöperatively associated with the support for successively affixing a plurality of stay-tabs to the face of a blank carried by said support.

8. In a machine of the character described, and in combination, a rotary support for a blank, means for feeding a blank to said support, and separate laterally spaced rotary means coöperatively associated with the support for successively affixing a plurality of stay-tabs to the face of a blank carried by said support.

9. In a machine of the character described and in combination, means for carrying a blank, means for supporting a pack of blanks, blank feeding means for successively delivering blanks from the pack to the blank carrier, and separate laterally spaced means coöperatively associated with the said blank carrier for successively affixing a plurality of stay-tabs to the face of a blank while on said carrier.

10. In a machine of the character described and in combination, a traveling support for a blank, means for supporting a pack of blanks, means for successively delivering blanks from the pack to said support, and separate laterally spaced means coöperatively associated with said traveling support for successively affixing a plurality of stay-tabs to the face of a blank while on said support.

11. In a machine of the character described and in combination, means for supporting a blank, separate laterally spaced means coöperatively associated with said supporting means for successively applying a plurality of stay-tabs to the face of a blank while on said support, and separate means for feeding stay-tab material to each of the said tab applying means.

12. In a machine of the character described and in combination, a traveling support for a blank, and laterally spaced means for successively applying a plurality of stay-tabs to the face of a blank during the traveling movement of said support.

13. In a machine of the character described and in combination, a rotary support for a blank, and separate laterally spaced means coöperatively associated therewith for successively affixing a plurality of stay-tabs in spaced relation on the face of said blank while on the support and during the traveling movement thereof.

14. In a machine of the character described and in combination, a rotary support for a blank, and separate laterally spaced rotary means coöperatively associated therewith for successively affixing a plurality of stay-tabs to the face of a blank while on said support and during the rotary movement thereof.

15. In a machine of the character described and in combination, a rotary support for a blank, separate laterally spaced rotary means for successively affixing a plurality of stay-tabs to the face of a blank carried by said support during the rotary movement thereof, and separate means for feeding stay-tab material to each of the said rotary affixing means.

16. In a machine of the character described and in combination, a rotary support for a blank, and opposed laterally spaced rotary means for carrying and successively affixing a plurality of stay-tabs to the face of a blank carried by said support during the movement thereof, said blank support and affixing means having rotary contacting faces.

17. In a machine of the character described and in combination, a traveling support for a blank, laterally spaced means coöperatively associated therewith for successively affixing a plurality of stay-tabs to the face of a blank while on said support, and means for delivering the tabbed blanks.

18. In a machine of the character described and in combination, a rotary support for a blank, separate laterally spaced means coöperatively associated therewith for successively affixing a plurality of stay-tabs to the face of a blank while on said support and during the rotary movement thereof, a receiving table, and means for delivering tabbed blanks from said support to said receiving table.

19. In a machine of the character described and in combination, a rotary support for a blank to be tabbed, laterally spaced rotary means coöperatively associated with said support for successively affixing a plurality of stay-tabs to the face of a blank carried by said support, a receiving table for the tabbed blanks, and means for delivering the blanks from the said support to the receiving table.

20. In a machine of the character described and in combination, rotary means for supporting and carrying a blank, means for supporting a pack of blanks, means for separating the lowermost blank of the pack and delivering the same to the said rotary support, separate laterally spaced means coöperatively associated with said rotary support for successively affixing a plurality of stay-tabs to the face of a blank during the movement of the said support, and means for feeding stay-tab material to each of the said affixing means.

21. In a machine of the character described and in combination, means for supporting a blank to be provided with corner stay-tabs, laterally spaced means for simultaneously affixing a pair of the tabs to the face of a blank carried by said support, a supply reel for the stay-tab material, and means for feeding the stay-tab material to each of the said affixing means.

22. In a machine of the character described, and in combination, a rotary support for carrying a blank to receive corner stay tabs, and a plurality of laterally spaced rotary tab affixing devices coöperatively associated with said blank support and positioned to affix a plurality of stay-tabs to the face of a blank while on said support, each of said rotary affixing devices including a gripper for the stay-tab.

23. In a machine of the character described and in combination, a rotary support for a blank to receive corner stay-tabs, a plurality of laterally and longitudinally spaced rotary tab affixing devices coöperatively associated with said blank support and adapted to successively affix pairs of stay-tabs to the face of the blank while on said support, and a tab moistening device coöperatively associated with each of the said tab affixing devices to moisten the tab during its movement toward the blank support.

24. In a machine for affixing corner staying tabs to the face of a covering blank and in combination, a rotary drum for supporting and carrying a blank, rotary tab carrying and affixing devices coöperatively associated with said drum and adapted, during rotation, to press and affix stay-tabs to the face of a blank carried by the drum, and means for adjusting said tab carrying and affixing devices toward and from each other, whereby the machine may operate upon blanks of different sizes.

25. In a machine for affixing corner staying tabs to the face of a covering blank and in combination, a rotary drum for supporting and carrying a blank, two pairs of rotary tab carrying and affixing devices coöperatively associated with said drum and adapted, during rotation, to successively press and affix tabs to the face of a blank carried by the drum, and means for adjusting said tab carrying and affixing devices toward and from each other, whereby the machine may operate upon blanks of different sizes.

26. In a machine for affixing corner-staying tabs to the face of a covering blank and in combination, a rotary drum for supporting and carrying a blank, rotary tab carrying and affixing devices coöperatively associated with said drum and adapted during rotation to press and affix tabs to the face of a blank carried by the drum, a gripper associated with each of said devices for retaining the tabs thereon during the movement of the devices toward the drum, and means for adjusting said tab carrying and affixing devices toward and from each other, whereby the machine may operate upon blanks of different sizes.

27. In a machine for affixing corner staying tabs to the face of a covering blank and in combination, a rotary drum for supporting and carrying a blank, laterally spaced rotary tab carrying and affixing devices coöperatively associated with said drum and adapted, during rotation, to successively press and affix a plurality of tabs to the face of a blank while on the drum, means for successively feeding tab strip material to said devices and means for severing the strip in tab lengths.

28. In a machine for affixing corner staying tabs to the face of a covering blank and in combination, a rotary drum for supporting and carrying a blank, laterally spaced rotary tab carrying and affixing devices coöperatively associated with said drum and adapted, during rotation, to successively press and affix a plurality of laterally and longitudinally spaced tabs to the face of a blank carried by the drum, a gripper carried by each of said devices, means for feeding said tab material to said devices to be gripped by the grippers, means for severing the said stay-tab material, and means for moistening the outer face of the stay-tabs during their movement toward the drum.

29. In a machine for affixing corner staying tabs to the face of a covering blank and in combination, a rotary drum for supporting and carrying a blank, laterally spaced rotary tab carrying and affixing devices coöperatively associated with said drum and adapted during rotation to successively press and affix a plurality of tabs to the face of a blank carried by the drum, a receiving table for the tabbed blanks, and means for successively delivering the blanks to said table.

30. In a machine for affixing corner staying tabs to the face of a covering blank and in combination, a rotary drum for supporting and carrying the blank, two pairs of laterally spaced rotary tab carrying and affixing devices coöperatively associated with said drum and adapted during rotation to successively press and affix two pairs of tabs to the face of a blank carried by the drum, a receiving table for the tabbed blanks, means for delivering blanks from the drum to said table, and means for lowering the table as the blanks are delivered thereto.

31. In a machine for affixing corner staying tabs to the face of a covering blank and in combination, means for supporting and carrying a blank, laterally spaced coöperating means for successively affixing two pairs of stay-tabs to the face of a blank while on said supporting and carrying means, a receiving table for the tabbed blanks, means for delivering the blanks to said receiving table, and automatic means for alining the blanks as they are delivered to the table.

32. In a machine for affixing corner staying tabs to the face of a covering blank and in combination, a rotary drum for supporting and carrying a blank, separate laterally spaced rotary tab carrying and affixing devices coöperatively associated with said drum and adapted, during rotation, to successively press and affix a plurality of laterally spaced tabs to the face of a blank carried by the drum, a receiving table for the tabbed blanks, means for successively delivering the tabbed blanks from the drum to the table, and means associated with the table for alining the blanks as they are delivered thereto.

33. In a machine for affixing corner staying tabs to the face of a covering blank and in combination, a rotary drum for supporting and carrying a blank, separate laterally spaced rotary tab carrying and affixing devices coöperatively associated with said drum and adapted during rotation to successively press and affix pairs of tabs to the face of a blank carried by the drum, a receiving table for the tabbed blanks, means for delivering the blanks from the drum to the table, a plurality of reciprocating arms adapted to engage and aline the blanks as they are delivered to the table, and means for actuating said arms.

34. In a machine for affixing corner staying tabs to the face of a covering blank and in combination, a rotary drum for supporting and carrying a blank, laterally spaced rotary tab carrying and affixing devices coöperatively associated with said drum and adapted, during rotation, to successively press and affix a plurality of tabs to the face of a blank carried by the drum, a receiving table for the tabbed blanks, a reciprocating carriage movable toward and from the drum for delivering the tabbed blanks to the table, and automatic means for reciprocating said carriage.

35. In a machine for affixing corner staying tabs to the face of a covering blank and in combination, a rotary drum for supporting and carrying a blank, two pairs of laterally spaced rotary tab carrying and affixing devices coöperatively associated with said drum and adapted, during rotation, to successively press and affix two pairs of tabs to the face of a blank carried by the drum, a receiving table for the tabbed blanks, a reciprocating carriage movable toward and from the drum for delivering the blanks to the table, and grippers carried by the carriage for retaining the blanks thereon during its movement from the drum toward the table.

36. In a machine for affixing corner staying tabs to the face of a covering blank, and in combination, means for supporting and carrying a blank, laterally spaced means for successively applying a plurality of staytabs to a face of the blank while on said supporting and carrying means, a receiving table for the tabbed blanks, means for delivering the blanks to said table, and automatic means for lowering the table with a step-by-step movement as the blanks are delivered thereto.

37. In a machine for affixing corner staying tabs to the face of a covering blank and in combination, a rotary drum for supporting and carrying a blank, laterally spaced rotary tab carrying and affixing devices coöperatively associated with said drum and adapted, during rotation, to successively press and affix a plurality of tabs to the face of a blank carried by the drum, a receiving table, means for delivering the tabbed blanks to said table, automatic means for gradually lowering the table as the blanks are fed thereto, and means for throwing the said automatic lowering means out of operation.

38. In a machine for affixing corner staying tabs to the face of a covering blank, and in combination, a rotary drum for supporting and carrying a blank, automatic means for successively feeding blanks to said drum, a plurality of laterally spaced rotary tab carrying and affixing devices coöperatively associated with said drum and adapted during rotation, to successively press and affix a plurality of tabs to the face of a blank carried by the drum, and means for delivering the tabbed blanks from the drum to a suitable support.

39. In a machine for affixing corner staying tabs to the face of a covering blank and in combination, a rotary drum for supporting and carrying a blank, automatic means for successively feeding blanks to said drum, two pairs of laterally spaced rotary tab carrying and affixing devices coöperatively associated with said drum and adapted, during rotation, to successively press and affix a plurality of tabs to the face of a blank carried by the drum, and means for feeding strips of stay-tab material to the said tab carrying and affixing devices.

40. In a machine for affixing corner staying tabs to the face of a covering blank and in combination, a rotary drum for supporting and carrying a blank, an inclined support for a pack of blanks to be tabbed, means for reciprocating said pack support, coöperating means for successively taking the lowermost blank from the pack and delivering it to the blank-supporting and carrying means, laterally spaced rotary tab carrying and affixing devices coöperatively associated with the said blank supporting and carrying means for successively affixing a plurality of tabs to the face of the blank, and means for delivering the tabbed blanks.

41. In a machine for affixing corner staying tabs to the face of a covering blank and in combination, a rotary drum for supporting and carrying a blank, a pair of rotary disks arranged adjacent said drum, means for adjusting said disks toward and from each other, and tab carrying segments adjustably mounted upon each disk.

42. In a machine for affixing corner staying tabs to the face of a covering blank and in combination, a rotary drum for supporting and carrying a blank, a pair of rotatable disks mounted for rotation adjacent said drum, a pair of tab carrying segments adjustably mounted on each disk, and means for adjustably supporting said segments.

43. In a machine for affixing corner staying tabs to the face of a covering blank and in combination, a rotary drum for supporting and carrying a blank, a pair of disks arranged parallel to each other and mounted for rotation adjacent said drum, means for adjusting said disks toward and from each other, a tab carrying segment carried by each disk, and means for adjusting said segments circumferentially relative to the disks.

44. In a machine for affixing corner staying tabs to the face of a covering blank and in combination, a rotary drum for supporting and carrying a blank, a pair of disks mounted for rotation adjacent said drum, a pair of tab carrying segments mounted on each disk, one in advance of the other, means for adjustably supporting said segments, and means for feeding stay tab material to the segments.

45. In a machine for affixing corner staying tabs to the face of a covering blank and in combination, a rotary drum for supporting and carrying a blank, a pair of rotary supports mounted for rotation adjacent said drum, a pair of stay-carrying segments mounted on each of said supports, a gripper carried by each segment, means for feeding strips of stay-tab material to said segments, and means for severing said strip of stay-tab material in stay-tab lengths.

46. In a machine for affixing corner staying tabs to the face of a covering blank and in combination, a rotary drum for supporting and carrying the blank, a pair of disks mounted for rotation adjacent said drum, tab carrying segments adjustably mounted on said disks, tab gripping fingers carried by the segments, separate means for feeding stay strip material to said segments, means for severing the strip, and means operating to open and close the grippers in sequence with the strip feeding and severing means.

47. In a machine for affixing corner staying tabs to the face of a covering blank and in combination, a rotary drum for supporting and carrying a blank, rotary tab carrying and affixing devices coöperatively associated with said drum and adapted, during rotation, to press and affix tabs to the face of a blank carried by the drum, gripper fingers carried by said affixing devices, means for feeding stay-strip material in stay-tab lengths, and adjustable means for controlling the operation of the said gripper fingers to cause them to operate in regular sequence with the strip feeding and severing means.

48. In a machine for affixing corner staying tabs to the face of a covering blank and in combination, a rotary drum for supporting and carrying a blank, pairs of laterally spaced rotary tab carrying and affixing devices coöperatively associated with said drum and adapted during rotation, to successively press and affix a plurality of tabs to the face of a blank carried by the drum, means for feeding stay-strip material to said affixing devices, and means for imparting an intermittent feed movement to the said strip feeding means.

49. In a machine for affixing corner staying tabs to the face of a covering blank and in combination, a rotary drum for supporting and carrying a blank, pairs of laterally spaced rotary tab carrying and affixing devices coöperatively associated with said drum and adapted, during rotation, to successively press and affix a plurality of tabs to the face of a blank carried by the drum, means for feeding stay-strip material to said devices, means for severing said strip, and means for imparting successive and alternate movements to said feeding and severing devices.

50. In a machine for affixing corner staying tabs to the face of a covering blank and in combination, a rotary drum for supporting and carrying a blank, laterally spaced rotary tab carrying and affixing devices coöperatively associated with said drum and adapted, during rotation, to successively press and affix a plurality of spaced tabs to the face of a blank carried by the drum, means for feeding strips of stay-tab material in the path of movement of said devices, grippers carried by said devices for gripping the ends of the stay-strip material as the latter are fed toward said devices, means for severing the strips of stay-strip material, and means for moistening the stay tabs carried by said devices during the movement of the latter toward the drum.

In testimony whereof we have hereunto set our hands in presence of two subscribing witnesses.

JAMES D. REIFSNYDER.
HENRY G. SCHWERDTLE.

Witnesses:
W. C. RAISNER,
J. L. CORNOG.